Figure 1:
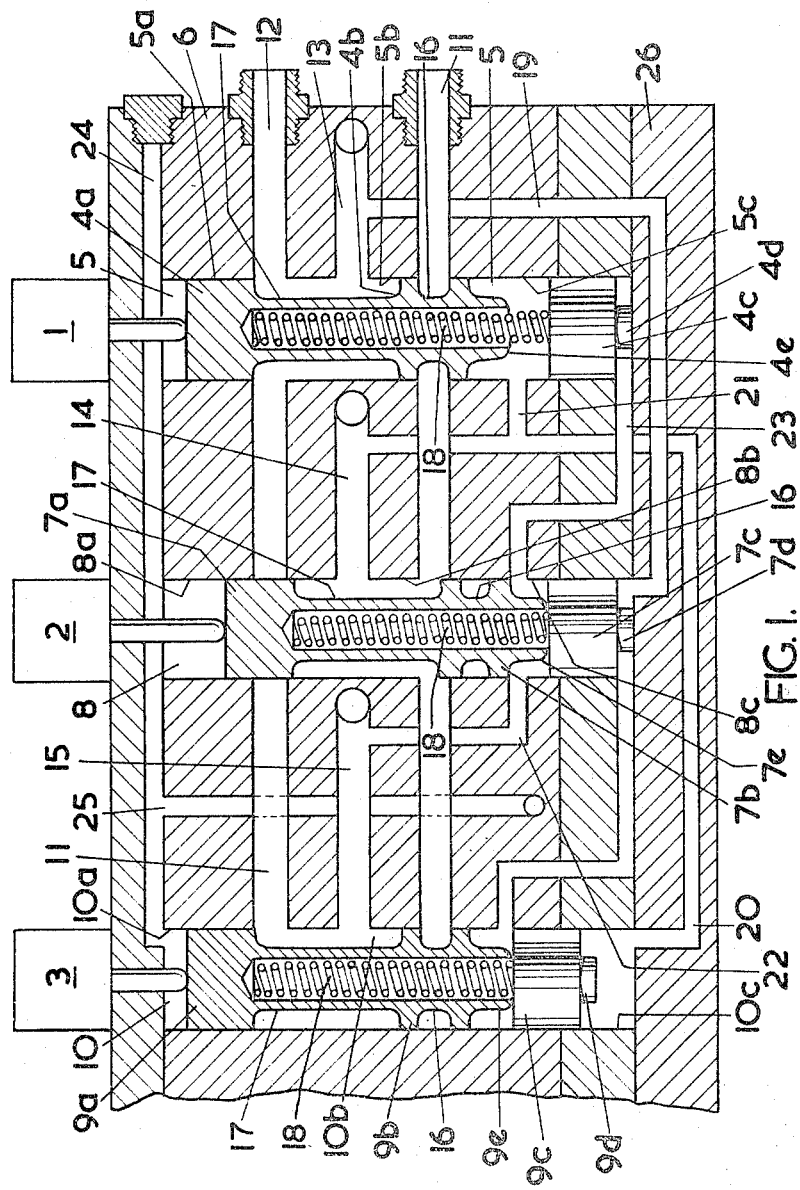

INVENTORS
S. H. BOOTH
E. W. A. SCRIVENER

By Cameron, Kerkam & Sutton
Attorneys

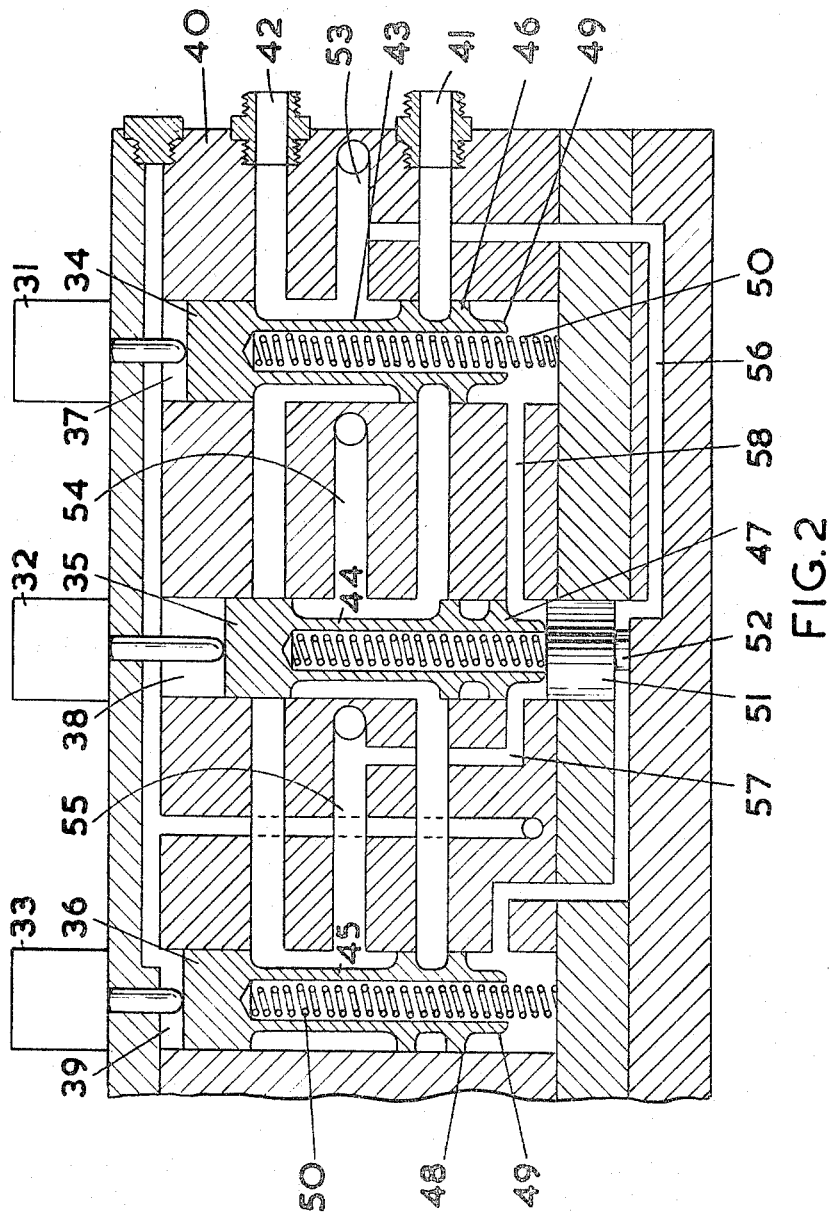

United States Patent Office 3,289,701
Patented Dec. 6, 1966

3,289,701
FLUID CONTROLLED SAFETY DEVICES FOR SELECTOR VALVES
Stanley Henshaw Booth, Wokingham, and Edward William Arthur Scrivener, Staines, England, assignors to Her Britannic Majesty's Principal Secretary of State for the War Department, Whitehall, London, England
Filed Mar. 3, 1964, Ser. No. 349,104
Claims priority, application Great Britain, Mar. 4, 1963, 8,503/63
10 Claims. (Cl. 137—637.1)

This invention relates to means for controlling the supply of fluid under pressure from a common source to separate supply lines each of which is controlled by a selector valve and the object of the invention is to provide control means whereby, when one supply line is connected to the source of supply the selector valves of other supply lines are prevented from being actuated to connect their associated supply lines with the source of supply.

According to this invention, on actuation of any one of a group of two or more selector valves to connect its supply line to the source of supply, fluid under pressure is also applied to the other valve or valves of the group to prevent actuation thereof whilst the selected valve remains in a position to allow the supply of fluid to its associated supply line.

The group may also include a valve which only controls the supply of fluid to its associated supply line, which valve is returned to its initial position by fluid pressure if any other valve of the group is actuated.

The invention is illustrated, by way of example only, in the accompanying drawings in which:

FIGURE 1 is a diagrammatic longitudinal sectional view of one form of control device according to this invention, and FIGURE 2 is a similar view of a modified form of the invention.

In the constructional form shown in FIGURE 1 a group of three electric solenoid energised switches or actuators 1, 2, 3, are employed to control selectively the supply of fluid under pressure to cylinders associated with the brake bands of epicyclic gearing by means of which the operative gear ratio of said gearing can be changed. The solenoid energised actuator 1 co-acts with a set of pistons 4a, 4b, 4c, located in a bore or cylinder 5 extending transversely of a valve block 6. Likewise, solenoid energised valve 2 co-acts with a series of points 7a, 7b, 7c, located in a bore or cylinder 8, and solenoid energised valve 3 co-acts with a series of pistons 9a, 9b, 9c located in a bore or cylinder 10. The axes of the bores or cylinders 8, 10, are parallel to the axis of the bore or cylinder 5 and are also disposed across the valve block 6. The valve block is also provided with two parallel channels 11, 12, which extend longitudinally of the valve block from a pressure or inlet port and an exhaust port therein; traversing two of the bores or cylinders 5, 8, and emerging into the third bore or cylinder 10 remote from the pressure and exhaust ports. Each of the bores or cylinders is thus divided into three sections, namely an upper section 5a, 8a, 10a, between the top of the valve block and the exhaust channel 12, a middle section 5b, 8b, 10b, between the exhaust channel and the pressure or inlet channel 11, and a lower section 5c, 8c, 10c, between the pressure channel 11 and the bottom of the valve block. The middle sections 5b, 8b, 10b, of the bores or cylinders 5, 8 and 10 are respectively connected by channels 13, 14, 15 in the valve block to brake band cylinders of an epicyclic gearing. In addition auxiliary and branch channels are also formed in the valve block as hereinafter described.

As before mentioned a set of pistons is located in each bore or cylinder, each set consisting of an upper piston, 4a, 7a, 9a, the upper face of which is respectively engaged by a plunger of solenoid energised actuator 1, 2, 3, a dumb-bell piston valve 4b, 7b, 9b (i.e. a valve spool having two square landed piston portions connected by a stem portion 16) rigidly connected to the upper piston by a tubular connecting rod 17, and a freely movable lower piston 4c, 7c, 9c, whose movements towards the lower end of the bores or cylinders are limited by a distance member 4d, 7d, 9d, i.e. axial projections from the faces of the pistons 4c, 7c, 9c. Likewise the minimum distance between the valves 4b, 7b, 9b, is determined by distance members 4e, 7e, 9e, carried by the dumb-bell piston valves.

Normally each of the valve sets is so disposed that its upper piston 4a, 7a, 9a, is located in the upper section of its bore or cylinder, the stem of the dumb-bell piston valve extends across but does not block the pressure channel 11 and its square landed piston portions respectively close the lower ends of the middle sections 5b, 8b, 10b, and the upper ends of the lower sections 5c, 8c, 10c, of the bore or cylinder, and the lower pistons 4c, 7c, 9c are located in the said lower sections of the bores or cylinders. With such disposition of the valve sets, energisation of the solenoid actuator 1 associated with the bore or cylinder 5 causes the plunger of the actuator to depress the upper piston 4a, and the dumb-bell piston valve 4b, against the action of a spring 18 housed in its tubular connecting rod 17, which spring normally serves to retain the upper piston in its uppermost position and the lower piston in its lowermost position. The piston 4a, thus enters and closes the upper end of the middle section 5b, of the bore or cylinder 5 and the piston valve 4b moves the lower piston 4c, to its lowermost position and itself moves away from the lower end of said middle section 5b to allow the pressure channel 11 to be in free communication with the said middle section and the brake band cylinder connected thereto by the channel 13. At the same time fluid under pressure is also fed from the said middle section of the bore or cylinder 5 or the channel 13 connecting it to a brake band cylinder, through an auxiliary channel 19 in the valve block to the lowermost end of the adjacent or second bore or cylinder 8 and to the lower section of the remote or third bore or cylinder 10 below and adjacent the lower end of the dumb-bell piston valve located therein. By this arrangement pressure under the the lower piston 7c in the bore or cylinder 8 and between the lower piston 9c, and the dumb-bell piston valve 9b in the third bore or cylinder 10 exerts upward thrusts to the upper pistons 7a, 9a, respectively in the bores or cylinders 8 and 10 which is such as to counteract any action by energisation of their associated solenoid energised actuators. Upon the solenoid of the actuator 1 associated with the bore or cylinder 5 being de-energised the pressure of fluid in the middle section 5b of the bore or cylinder 5 will act on the upper piston 4a, to return it towards its initial position until the dumb-bell piston valve 4b moved therewith closes the lower end of the section 5a of the bore or cylinder and thereafter the fluid in the pressure channel acts on the dumb-bell piston valve to complete movement of the piston 4a to its initial position.

Should the solenoid actuator 2 associated with the second bore or channel 8 be energised when all the valve sets are in their initial position, the plunger of the said solenoid actuator will depress its associated piston 7a, as shown, and an auxiliary channel 20 leading from the middle section 8b, of the bore or cylinder 8 or from the channel 14 leading therefrom conveys fluid under pressure to the lowermost end of the third bore or cylinder 10. A branch line 21 from this auxiliary channel leads into the lower section of the first bore or cylinders 5 beneath and adjacent the dumb-bell piston valve and above the piston 4c to apply upward thrust to the plungers of the solenoid actuators 1 and 3 associated with said bores or cylinders 5 and 10.

In like manner, if the solenoid actuator 3 associated with the third bore or cylinder 10, i.e. the bore or cylinder remote from the pressure and exhaust ports, is energised its associated piston set 9a, 9b, 9c will be depressed and fluid under pressure is conveyed through an auxiliary channel 22 leading from the middle section 10b of the third bore or cylinder 10 or from the channel 15 leading therefrom to the lower section 8c of the second bore or cylinder 8 below and adjacent the dumb-bell pistol valve 7b located therein. A further channel 23 leads from adjacent and beneath this dumb-bell piston valve to the lowermost end of the first bore or cylinder 5 so that fluid under pressure can also pass from the lower section of the second bore or cylinder 8 to apply upward thrust to the underside of the lower piston in the first bore or cylinder 5.

With such a construction of valve block and piston sets fluid under pressure is not fed to the lower section of the bore or cylinder associated with an operative solenoid energised actuator but exerts thrust upon the piston sets associated with the other actuators to prevent them operating pistons to close unselected pressure fluid circuits such as might happen if the solenoid of an unselected actuator were energised by a short circuit occurring in an electric circuit. The uppermost ends of the bores or cylinders are connected to one another by a channel 24 which is connected to the gear box of the epicyclic gearing or to any other suitable exhaust through a bore 25.

More than three selector valves may, however, be included in one group. In this case the lower section of each bore or cylinder will have a plurality of pistons housed therein that have distance members between them, e.g. axial projections extending from their lower faces, so that spaces are left between adjacent pistons to which fluid under pressure can be fed. The number of such pistons, including the dumb-bell valve piston, will be one less than the number of selector actuators included in the group.

If desired the valve block may include the bores or cylinders and the requisite channels for two or more groups of piston sets. Moreover, as shown, the valve block may be housed in a casing 26 in which some of the auxiliary channels or branch channels may be formed either wholly or in part.

In the modified construction of safety device shown in FIGURE 2, provision is made so that, for example, when one of the selector valves controls the reverse train of an epicyclic gear, the reverse gear cannot remain in operation if an electrical fault occurs in any of the selector actuators.

As shown, a group of three electric solenoid energised actuators or switches 31, 32, 33, are employed to control selectively the supply of fluid under pressure to brake cylinders associated with the brake bands of an epicyclic gear, the actuator 32 being employed to control the reverse gearing. The actuators 31, 32, 33, are respectively associated with pistons 34, 35, 36 slidable in bores or cylinders 37, 38, 39, disposed transversely in a valve block 40. Extending longitudinally of the valve block is an inlet or pressure channel 41 and an exhaust channel 42, which channels serve to divide the bores or channels into three portions, i.e. an upper portion a middle portion and a lower portion. Extending from the pistons 34, 35, 36 are tubular connecting rods 43, 44, 45, supporting dumb-bell piston valves 46, 47, 48, each of which is provided at its lower end with a distance piece or extension 49 of reduced diameter. Each piston, and its associated connecting rod and dumb-bell piston valve may be formed as a unitary or integral structure. In each of the tubular connecting rods is housed a spring 50 that exerts pressure upon its associated piston 34, 35, 36. The bore or cylinder 38 is of greater length than the bores or cylinders 37, 39, and has housed in its lower portion a freely mounted piston 51 having a distance piece 52 projecting from its lower face. From the middle portion of the bore or cylinder 37 a channel 53 extends to a brake band cylinder of an epicyclic gear. In like manner the middle portions of the bores or channels 38, 39 are connected to other brake band cylinders of the epicyclic gearing by channels 54, 55.

If, when the pistons 34, 35, 36 are in their uppermost positions, the actuator 31 is energised, its plunger will depress the piston 34 and the dumb-bell piston valve 46 to cut off the middle portion of the bore or cylinder 37 from the exhaust channel 42 and to connect the pressure channel 41 with the channel 53. Additionally to pressure fluid flowing through the channel 53 to a brake band cylinder, fluid will flow through an auxiliary channel 56, to the lower part of the bore or cylinder 38 beneath the piston 51 and to the lower part of the bore or cylinder 39 beneath the dumb-bell piston valve 48 thereby assisting their springs 50 to maintain the pistons 35, 36 in their uppermost positions. Similarly if the actuator 33 is energised the plunger will depress the piston 36 and the dumb-bell piston valve 48 to cut off the middle portion of the bore or cylinder 39 from the exhaust channel 42 and to connect the pressure channel 41 with the channel 55. An auxiliary channel 57 supplies fluid under pressure from the channel 55 to the lower part of the bore or cylinder 38 beneath the dumb-bell piston valve 47, from which cylinder fluid under pressure can flow through a further auxiliary channel 58 to the lower part of the bore or cylinder 37. Fluid under pressure is thereby fed to both cylinders 37 and 38 and serves to apply additional effort to retain them in their uppermost position. Thus if either actuator 31 or 33 is operated the pistons associated with the other two actuators are pressed upwardly with a force greater than that applied by the actuator. In consequence if, due for example to a short-circuit of an electrical circuit, an unauthorised energisation of an actuator takes place such actuator will not operate its associated piston and dumb-bell piston valve.

On the other hand if actuator 32 is energised it will only serve to connect the pressure or inlet channel 41 with the channel 54 leading to the cylinder of the reverse gear brake band. Therefore if, whilst the epicyclic gearing is in reverse gear, either of the other actuators is inadvertently energised its associated piston and dumb-bell will be actuated and fluid under pressure will be fed to the bore or cylinder 38 to move its piston 35 to its uppermost position and cut out the reverse gearing.

We claim:
1. A safety control means for the supply of fluid under pressure from a common source of supply to separate supply lines, comprising a group of at least two selector valves each of which controls a separate supply line, separate means for actuating each selector valve, and auxiliary lines controlled by each selector valve to supply fluid to act on other selector valves of the group to prevent their actuation when it has been actuated to connect its supply line to the source of supply.

2. A safety control means for the supply of fluid under pressure from a common source of supply to separate supply lines, comprising a group of at least two selector valves each of which controls a separate supply line, separate means for actuating each selector valve to connect its supply line to the common source of supply, means for continuously urging said selector valves towards their actuating means and auxiliary lines associated and controlled by each selector valve whereby, when it is actuated, fluid under pressure acts upon the other selector valves to augment the pressure urging them towards their actuating means.

3. A safety control means for the supply of fluid under pressure from a common source of supply to separate supply lines, comprising a group of selector valves each of which controls a separate supply line, separate means for actuating each selector valve to connect its supply line to the common source of supply, means for continuously urging said selector valves towards their actuating means, and auxiliary lines associated with some selector valves whereby, when any of such selector valves is actuated to connect its supply line to the common source of supply, fluid under pressure is supplied through said auxiliary supply lines to augment the thrust extended on all the other selector valves.

4. A safety control means for the supply of fluid under pressure from a common source of supply to separate supply lines, comprising a valve block, cylinders transversely of said valve block, parallel fluid inlet and exhaust channels disposed longitudinally of said valve block and extending across said cylinders, a valve actuator adjacent one end of each cylinder, a dumb-bell piston valve slidable in each cylinder, means for urging said valves towards said valve actuators, floating pistons in said cylinders spaced from said piston valves and located remote from the valve actuators, separate channels in said valve block leading from said cylinders to separate supply lines, and auxiliary channels from said channels leading to the other cylinders whereby on actuation of one piston valve to connect the inlet channel to its associated channel and supply line, fluid under pressure is also fed to each of the other cylinders to supplement the means urging their piston valves towards their valve actuators.

5. A safety control means for the supply of fluid under pressure from a common source of supply to separate supply lines comprising a valve block, cylinders extending transversely of said valve block, a fluid inlet channel extending longitudinally of said valve block and across said cylinders, an exhaust channel extending longitudinally of said valve block and across said cylinders, separate supply channels extending from each cylinder between said inlet and exhaust channels, selector valves slidable in said cylinders, means associated with each cylinder for actuating its selector valve, means for continuously urging each selector valve towards its actuating means, and auxiliary channels associated with each selector valve which, when it is actuated to connect its supply line to the source of supply, also permits fluid to flow through its associated auxiliary channels to the other cylinders to augment the means for urging their selector valves towards their actuating means.

6. A safety control means as claimed in claim 5, in which the selector valves are dumb-bell piston valves.

7. A safety control means as claimed in claim 5, in which floating pistons with distance pieces thereon are disposed in each cylinder beyond the end of the selector valve remote from the valve actuating means.

8. A safety control means for the supply of fluid under pressure from a common source of supply to separate supply lines, comprising a valve block, cylinders extending transversely of said valve block, a fluid inlet channel and an exhaust channel, both extending longitudinally of said valve block and across said cylinders, supply channels extending from each cylinder from between the inlet and exhaust channels to separate supply lines, valve sets slidable in said cylinders and each consisting of a dumb-bell piston valve, a piston at one end thereof and connected thereto, a floating piston located at its other end, and distance pieces at the ends of the floating piston, means for actuating the piston and dumb-bell piston valve in each cylinder, means for continuously urging each piston and dumb-bell piston valve towards their actuating means, and auxiliary channels associated with each cylinder whereby when one dumb-bell piston valve is actuated to connect its supply line with the source of supply, fluid under pressure is supplied to the other cylinders to supplement the pressure applied to the dumb-bell piston valves therein which urges them towards their actuating means.

9. A safety control means for the supply of fluid under pressure from a common source of supply to separate supply lines, comprising a valve block, cylinders extending transversely of said valve block, fluid inlet and exhaust channels extending longitudinally of said valve block and across said cylinders, separate supply channels extending from each cylinder between said inlet and exhaust channels to separate supply lines, a dumb-bell piston valve slidable in each of said cylinders, a valve actuator adjacent one end of each cylinder, springs for urging said dumb-bell piston valves towards their actuators, a plurality of said piston valves having associated therewith auxiliary channels which, when either of such piston valves is actuated to connect its fluid supply channel with the fluid inlet channel, supplies fluid under pressure to the other cylinders to augment the action of the springs acting on their piston valves, and at least one of said piston valves which connects only its supply line to said inlet channel.

10. A safety control means as claimed in claim 9, in which, in association with the piston valve which connects only its supply line to the inlet channel, a floating piston with distance pieces is located in its cylinder remote from the valve actuator.

References Cited by the Examiner
UNITED STATES PATENTS

| | | | |
|---|---|---|---|
| 1,298,226 | 3/1919 | Landis | 137—637 X |
| 2,206,163 | 7/1940 | Clench | 137—627.1 X |
| 2,396,993 | 3/1946 | Fawkes | 137—637 |
| 2,592,798 | 4/1952 | Fenger | 137—637.1 |
| 3,019,816 | 2/1962 | Larsen | 137—596.12 X |

WILLIAM F. O'DEA, *Primary Examiner.*

C. GORDON, *Examiner.*